(12) United States Patent
Genet et al.

(10) Patent No.: US 11,919,566 B2
(45) Date of Patent: Mar. 5, 2024

(54) STOP FOR ABSORBING LATERAL LOADS

(71) Applicant: Robert Bosch Automotive Steering Vendome, Vendome (FR)

(72) Inventors: Nicolas Genet, Coulommiers la Tour (FR); Thomas Jorigne, Cande sur Beuvron (FR); Fredie Gouge, Sainte Anne (FR)

(73) Assignee: Robert Bosch Automotive Steering Vendome, Vendome (FR)

( * ) Notice: Subject to any disclaimer, the term of this patent is extended or adjusted under 35 U.S.C. 154(b) by 31 days.

(21) Appl. No.: 17/753,907

(22) PCT Filed: Sep. 14, 2020

(86) PCT No.: PCT/FR2020/051583
§ 371 (c)(1),
(2) Date: Mar. 17, 2022

(87) PCT Pub. No.: WO2021/053287
PCT Pub. Date: Mar. 25, 2021

(65) Prior Publication Data
US 2022/0355852 A1 Nov. 10, 2022

(30) Foreign Application Priority Data
Sep. 19, 2019 (FR) .................................... 1910337

(51) Int. Cl.
*B62D 1/19* (2006.01)
*B62D 1/184* (2006.01)

(52) U.S. Cl.
CPC ............. *B62D 1/192* (2013.01); *B62D 1/184* (2013.01)

(58) Field of Classification Search
CPC ........... B62D 1/192; B62D 1/18; B62D 1/195
See application file for complete search history.

(56) References Cited

U.S. PATENT DOCUMENTS 9,694,842 B2 * 7/2017 Tanaka ................... B62D 1/195

FOREIGN PATENT DOCUMENTS

WO WO-2019115796 A1 * 6/2019 ............. B62D 1/184

OTHER PUBLICATIONS

Frelon, Jun. 2019, WO-2019115796-A1, Machine Translation of Specification.*
International Search Report corresponding to International Patent Application No. PCT/FR2020/051583, dated Dec. 23, 2020 (5 pages).

* cited by examiner

*Primary Examiner* — Paul N Dickson
*Assistant Examiner* — Matthew Joseph Ganci
(74) *Attorney, Agent, or Firm* — Maginot, Moore & Beck LLP

(57) ABSTRACT

An X-axis steering column includes a cap, a U-shaped tab attached to the cap, and an upper tube that slides relative to a lower tube. An attachment for attaching the cap to the U-shaped tab includes two screws and at least one stop in contact with at least one lateral groove. The at least one stop is configured to absorb lateral loads without any longitudinal movement of the steering column being impeded, including during adjustment of the steering column or during an impact due to a collision.

12 Claims, 15 Drawing Sheets

STOP FOR ABSORBING LATERAL LOADS

This application is a 35 U.S.C. § 371 National Stage Application of PCT/FR2020/051583, filed on Sep. 14, 2020, which claims the benefit of priority to Serial No. FR 1910337, filed on Sep. 19, 2019 in France, the disclosures of which are incorporated herein by reference in their entirety.

The disclosure relates to the field of vehicle steering columns and more particularly to steering columns which can be adjusted in rotation and in translation with respect to a support base fixed to the chassis of the vehicle.

These steering columns are intended in particular but not exclusively for a motor vehicle.

Background

Steering columns transmit the rotation of the steering wheel to the wheels in order to modify their orientation, for example in the following order: the steering wheel, the steering column, the intermediate shaft, the rack and finally the wheels.

Present-day steering columns allow reach and/or rake adjustment of the steering wheel.

A steering column conventionally comprises:
 a steering member intended to be connected to a vehicle steering wheel,
 a support base supporting this steering member with respect to the chassis of the vehicle,
 clamping means arranged so as to be able to lock the steering member on this support base.

Motor vehicle manufacturers require increasingly high performances from the various systems constituting the vehicles and in particular the steering columns. This performance manifests itself especially in:
 a better perception of quality of the column by the driver: in this regard, the behavior requirements of the steering wheel when the driver forces it radially prescribe increasingly stiff connections between the various components and systems constituting a steering column.
 meeting requirements in the event of a collision with an adjustable system absorbing the energy caused by the impact of the driver on the airbag.
 the optimization of manufacturing costs by reducing the number of components constituting a steering column.

Presently, steering columns are constituted by a subassembly comprising a cover and a U-shaped tab taking up any force applied to the steering wheel and retracting during a collision if the driver impacts the steering wheel. By way of this translational movement, a friction system generates a force making it possible to absorb the impact energy.

However, there is a residual lateral clearance between the cover and the U-shaped tab, since the clamping effect of the screws for fixing the cover to the U-shaped part should not be too great since an excessively stiff connection would prevent the steering wheel from retracting in the event of a collision.

Summary

An object of the disclosure is to overcome the abovementioned drawbacks of the prior art and in particular a robust connection without clearance between the cover and the U-shaped tab for withstanding the lateral loads applied to the steering wheel.

The steering column according to the disclosure has an axis X and comprises a cover, a U-shaped tab fixed to the cover, and an upper tube that can slide with respect to a lower tube, said steering column is characterized in that the fixation of the cover to the U-shaped tab comprises at least one fixing screw and at least one stop in contact with at least one lateral surface. Lateral surface is understood here to mean a bearing surface disposed on one of the sides of the column and having a length extending in a plane perpendicular to the surface of the cover. This stop makes it possible to take up the lateral forces without impeding any longitudinal displacement of the column whether it is in the event of adjustment thereof or in the event of an impact caused by a collision.

The advantage of the disclosure is to separate the control of the forces of a collision from the stiffness of the column.

The fixing screws are only used to keep the U-shaped tab held against the cover and to manage the absorption force of a collision. By virtue of the disclosure, it is thus possible to regulate the desired force by varying the clamping tension of these screws, without being concerned with the lateral deflection of the column. This is now ensured by an assembly of the U-shaped tab which is directly in contact with the cover at the stops. In this way, the contribution of this subassembly (screw/cover) to the deflection of the column under lateral loading is completely eliminated. Lastly, the assembly is also simplified: the U-shaped tab positions and centers itself on the cover by itself.

These improvements are integrated in the components already present, by way of stamped shapes, adapted cutouts or existing parts. The economic impact is therefore greatly reduced.

Advantageously, the lateral surface forms an angle of between 10° and 45° with the axis X. With preference, the angle $\alpha$ will be between 20-25°, preferably equal to 25°. This angle makes it possible to have a sufficiently great take-up of the lateral force while at the same time being able to take into account the manufacturing tolerances. This is because an excessively low angle would prevent the assembly of the cover with the U-shaped tab and an excessively high angle would limit the take-up of lateral force. To ensure a good take-up of the lateral forces, the value of the angle of contact with respect to the column axis, between these stops and the edges of the grooves in the cover, should be chosen depending on the take-up of force desired.

According to a particular feature, the lateral surface is disposed in a lateral groove which extends along the axis X and which has a vertical indentation. The extension of the groove makes it possible for the U-shaped tab to slide back on the cover and its vertical indentation makes it possible for the stop to leave the lateral groove.

According to a first variant, the stop is made from a semi-cutout. This semi-cutout may be made in the U-shaped tab or in the cover. Bearing zones should then be created on the cover or the U-shaped tab depending on the case. The stop can therefore be made in a simple and economic manner.

According to a second variant, the stop is constituted by a force-fitted peg. The stop can therefore be implemented in a simple and economic manner.

According to a third variant, the stop is constituted by a screw for fixing the cover to the U-shaped tab. Since these screws are already present, it is not necessary to provide an additional part or operation. However, the grooves should be adapted or scratches may be made in the cover forming a bead of material against the head of the screws.

According to a first embodiment, the stop is disposed on the U-shaped tab and the surface in the cover.

According to a second embodiment, the stop is disposed on the cover and the surface in the U-shaped tab.

Advantageously, there are two stops and two lateral surfaces disposed on either side of the cover and of the U-shaped tab. The use of two stops makes better retention possible.

According to a fourth variant, the stop comprises a spring element. It would be possible, for example, to provide strips which are bent or twisted in a V shape and which are located in the central part of the cover or of the U-shaped tab. It is also possible to add a leaf spring between the stop and the opposite face of the groove.

According to a fifth variant, the stop is made in one piece with the cover or the U-shaped part. It is also possible to envisage a deformation of the assembly which could laterally lock the position of the U-shaped tab on the cover. The cover is assembled on the U-shaped tab and then a cutout in the cover or in the U-shaped part is deformed by bringing it out so as to thus constitute a stop.

According to a sixth variant, the stop is constituted by scratches made in the surface of the cover facing the screw for fixing said cover to the U-shaped part. These scratches could be made after said screws have been assembled by any tool, such as for example a screwdriver.

Advantageously, the steering column is adjustable.

BRIEF DESCRIPTION OF THE DRAWINGS

Other features and advantages of the disclosure will become more clearly apparent upon reading the following detailed description of multiple embodiments of the disclosure, which are given by way of nonlimiting example and are illustrated by the appended drawings, in which:
  is a perspective view of a steering column according to the disclosure;
  shows the subassembly constituted by the cover and the U-shaped part according to the disclosure;
  is a top view of the steering column of FIG. 1;
  shows the detail of a first stop on one of the lateral sides;
  shows the detail of a second stop on the second lateral side;
  is a top view of the steering column of FIG. 1 after a collision;
  is a sectional view along H-H of FIG. 6;
  shows a section of the detail C of a stop of FIG. 7;
  is a sectional view of the groove with the stop after a collision;
  shows the detail of a stop on a single lateral side;
  shows the detail of a stop with a spring element;
  shows the detail of a screw serving as a stop on one lateral side;
  shows the detail of a semi-cutout stop deformed during the assembly on one lateral side;
  shows the detail of a stop made by a scratch on one lateral side;
  shows a stop constituted by a protrusion on the cover.

DETAILED DESCRIPTION

Figure 1:
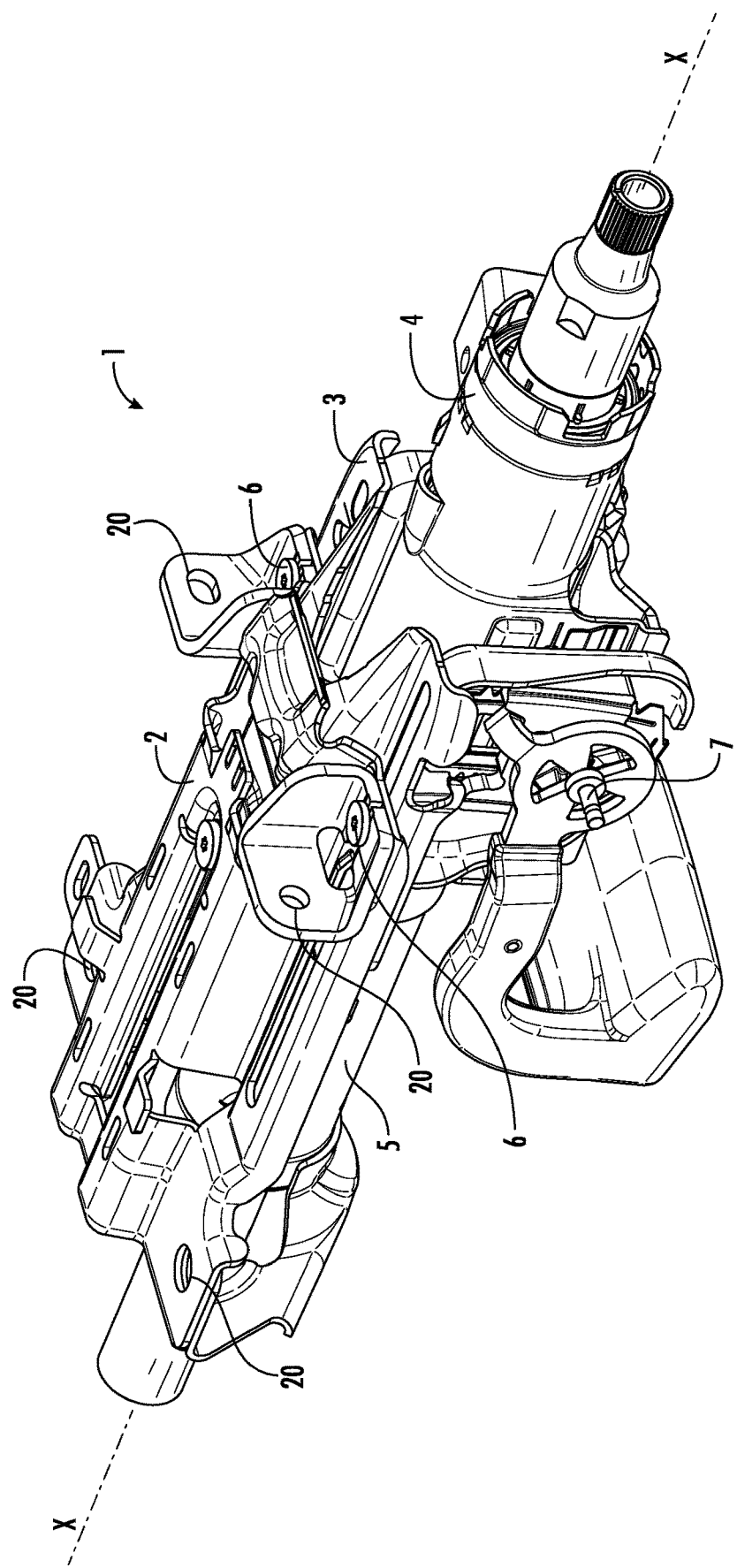

In the rest of the description, it will be considered that the top corresponds to the top of FIG. 1 and the bottom corresponds to the bottom of the same figure. The front will correspond to the front of the vehicle, that is to say the left-hand side of FIG. 1.

As can be seen in FIG. 1, the steering column 1 of axis X comprises a cover 2, a U-shaped tab 3 and an upper tube 4 which can slide with respect to a lower tube 5.

The cover 2, which is fixed to the chassis of the vehicle at four points 20, remains fixed in place in the event of a collision. The U-shaped tab 3 is fixed for the one part to the cover 2 via three fixing screws 6. The tab 3 is connected for the other part to the upper tube 4 by way of a locking system 7 which makes it possible, in its open position, to adjust the position of the steering wheel.

Figure 2:
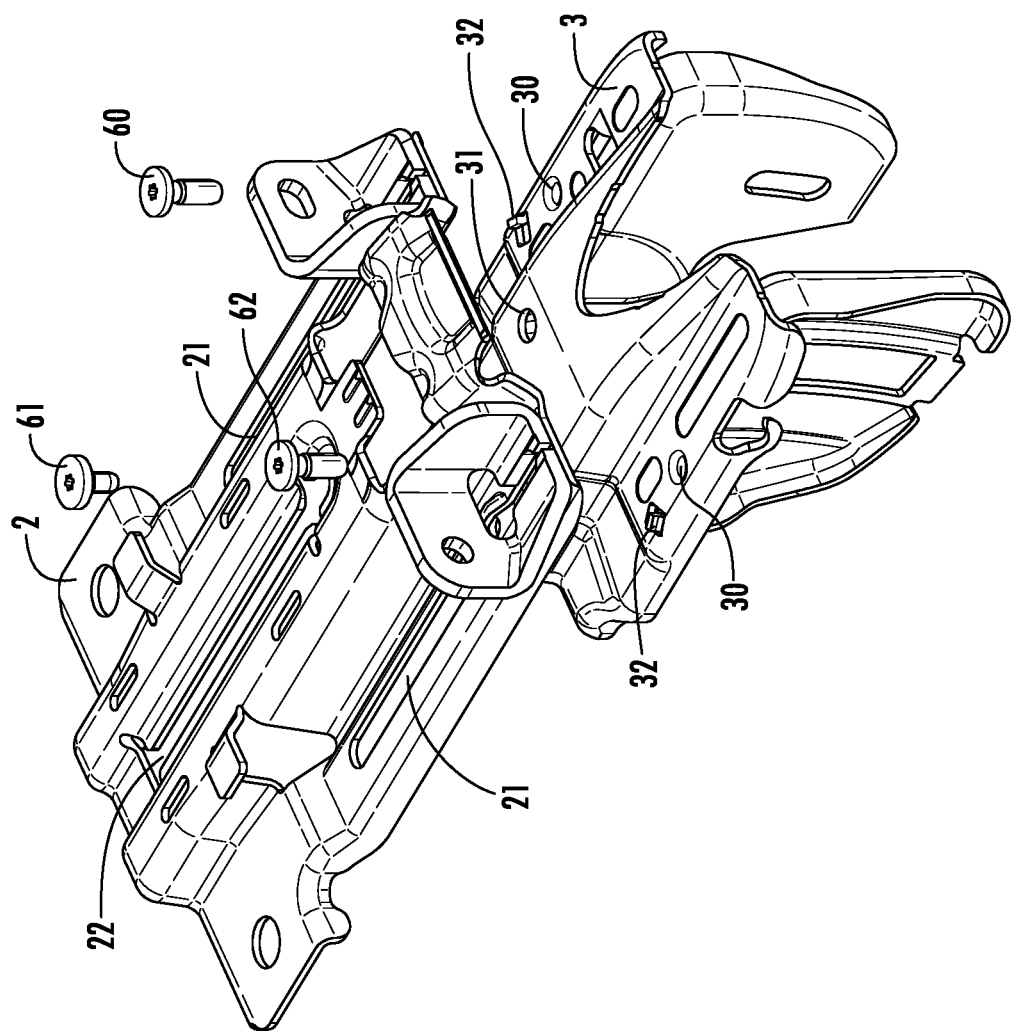

The cover 2 has two longitudinal grooves 21, which are open to the rear, allowing the forward displacement of the lateral fixing screws 60 and 62 and a central groove 22 allowing the displacement of the central screw 61 (cf. FIG. 2) during a collision.

Figure 4:
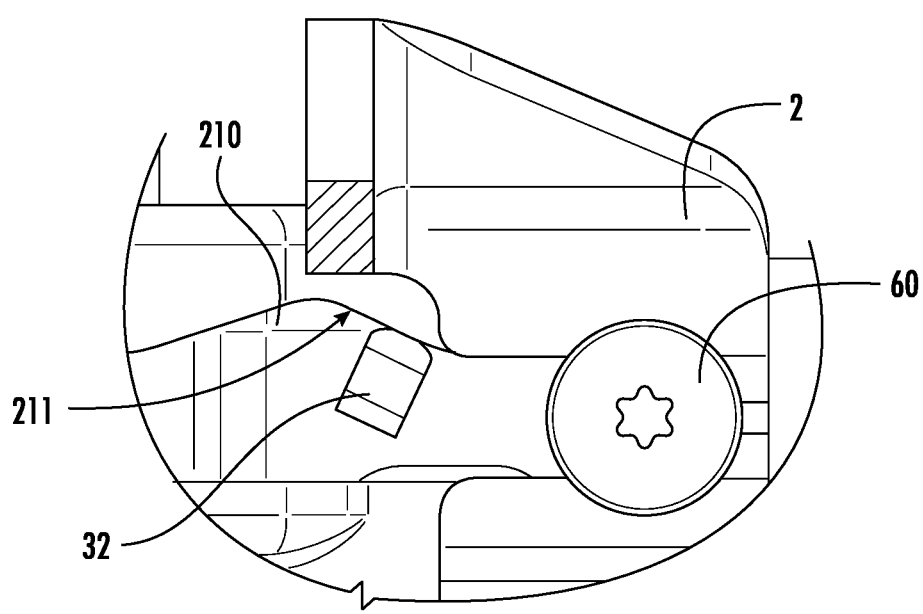
Figure 5:
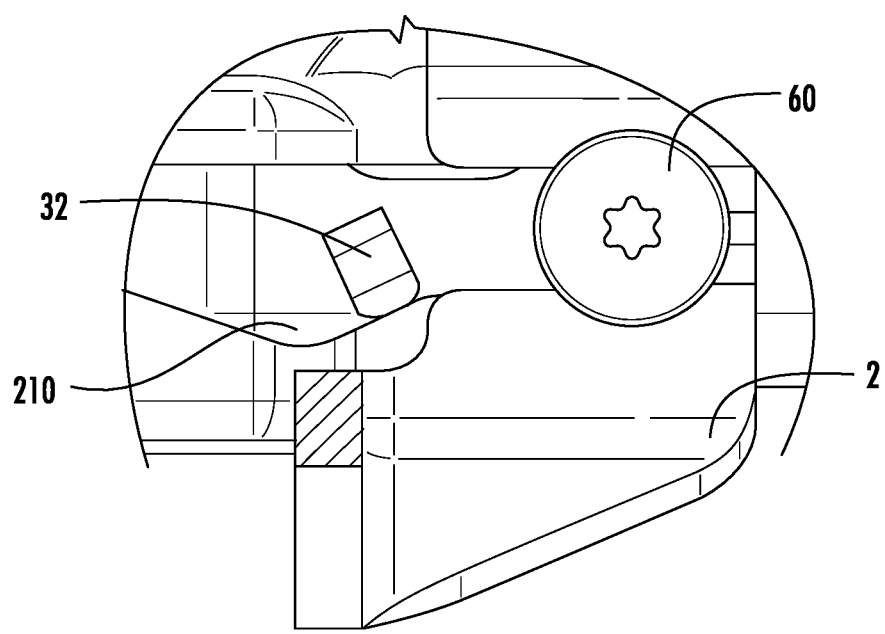

Each of the longitudinal grooves 21 has at a rear end a substantially V-shaped notch 210 (cf. FIGS. 4 and 5), in which a stop 32 is positioned. This notch 210 comprises a bearing surface 211 on a first side of the V against which bearing surface the stop 32 comes to bear. This bearing surface 211 makes a non-zero angle $\alpha$ with the axis X, preferably of between 10° and 45°, preferably approximately 25°.

Figure 9:
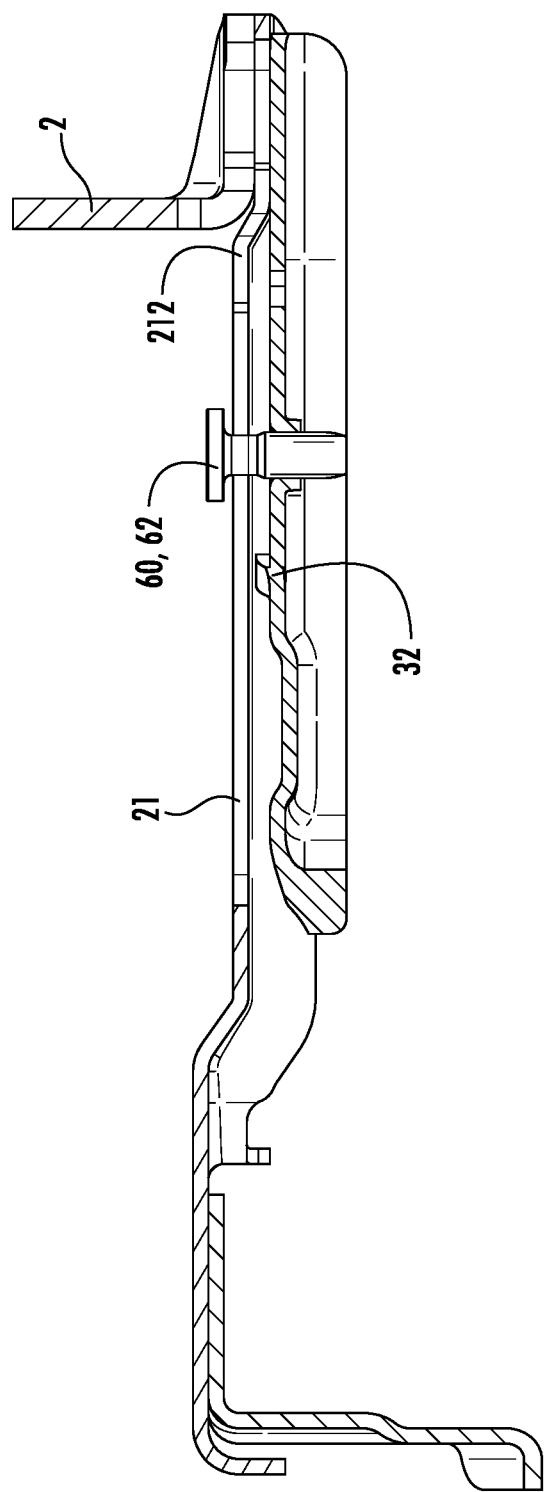

The groove 21 has a vertical indentation 212 on the second side of the V situated opposite the bearing surface 211 so as to allow the stop 32 to slide forward with the U-shaped tab 3. Since the assembly comprises the U-shaped tab 3, the upper tube 4 is movable in the event of a collision in order to allow the steering wheel to retract along the axis X of the column under the effect of the force applied by the driver to the steering wheel. This is why the size and the position of the stops are defined so that they do not disturb the travel of the tab during a collision, or do not create any excess force. A minimum clearance is therefore provided between these stops and the cover over the entire travel of the column during a collision (see FIG. 9).

The U-shaped tab 3 has two lateral holes 30 made in it allowing the lateral screws 60 and 62 to be screwed in and has a central hole 31 made in it for screwing in the central screw 61.

Two stops 32 are disposed on either side of the U-shaped tab 3 close to the lateral hole 30 in order to facilitate the positioning of the tab on the cover.

When the cover 2 is being assembled on the U-shaped tab 3, the cover is positioned such that each stop 32 is in the notch 210 of the corresponding groove 21, the cover 2 is forced forward until the two stops 32 are in contact with the bearing surface 211, and then pressing is performed until the force is great enough to laterally retain the cover 2, and the screws 6 are screwed in to lock the subassembly.

Figure 3:
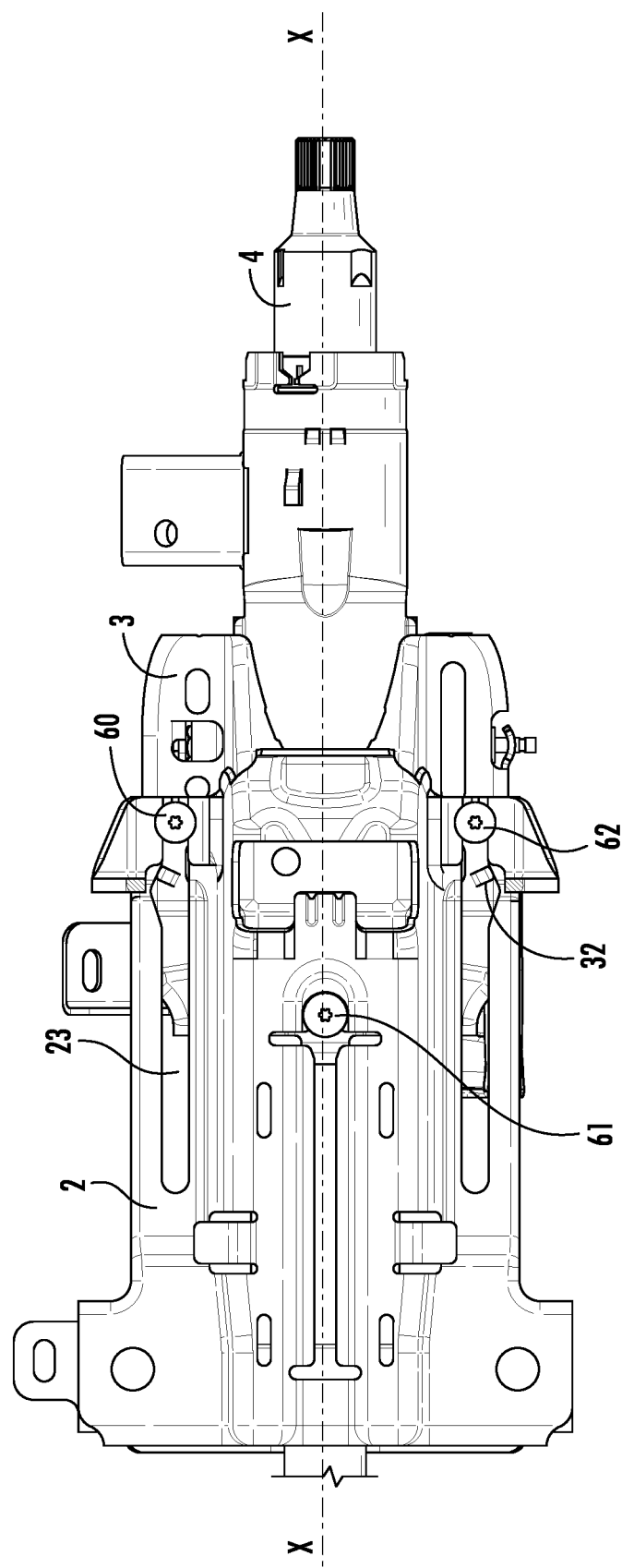
Figure 6:
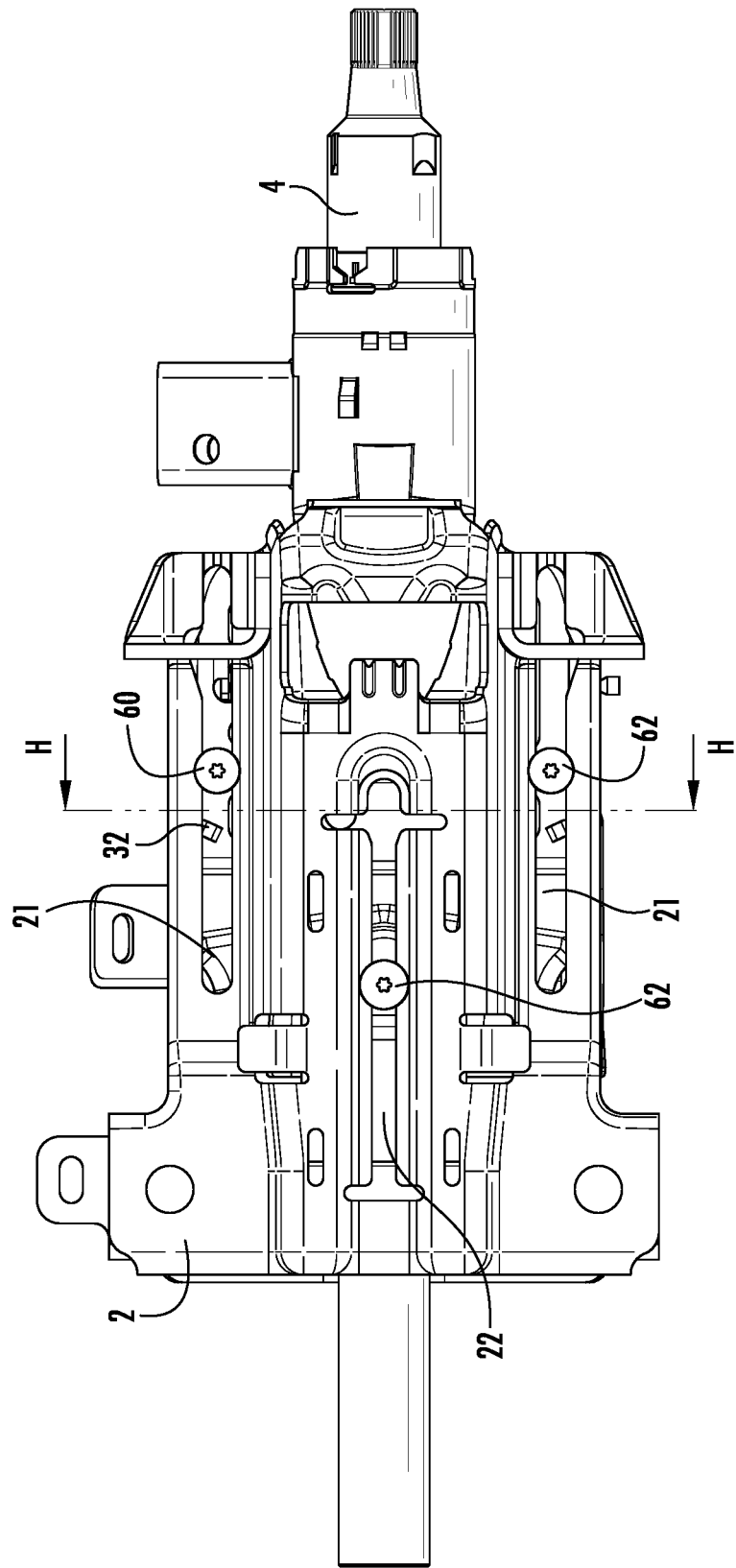
Figure 7:
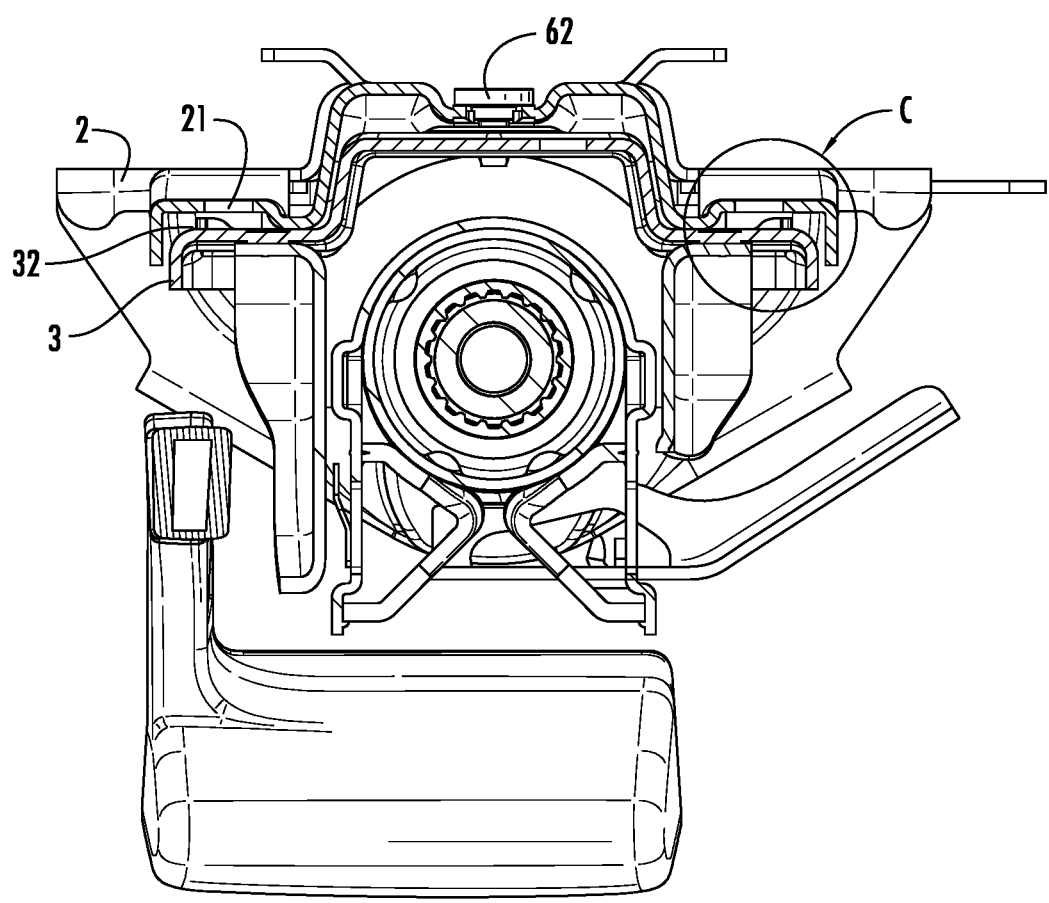
Figure 8:
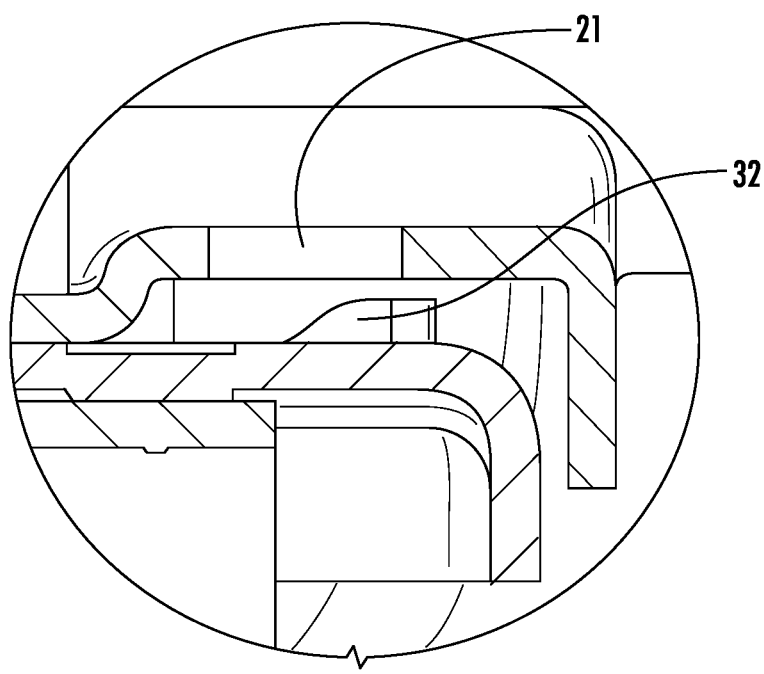

It can be seen in FIGS. 3 and 6 that in the event of a collision of the vehicle, the steering column 1 will undergo deformation from the position illustrated in FIG. 3, with the U-shaped tab 3 and the upper tube 4 sliding back on the cover 2, to the position illustrated in FIG. 6. During this deformation, the stops 32 are displaced first of all in the notch 210 in the bearing surface 211 as far as the vertical indentation 212 in the groove 21 which will allow them to leave said groove 21 and to be displaced without additional force.

In the remainder of the description, reference will be made to the stop 32, the various forms thereof will be referenced specifically by a different number.

Figure 10:
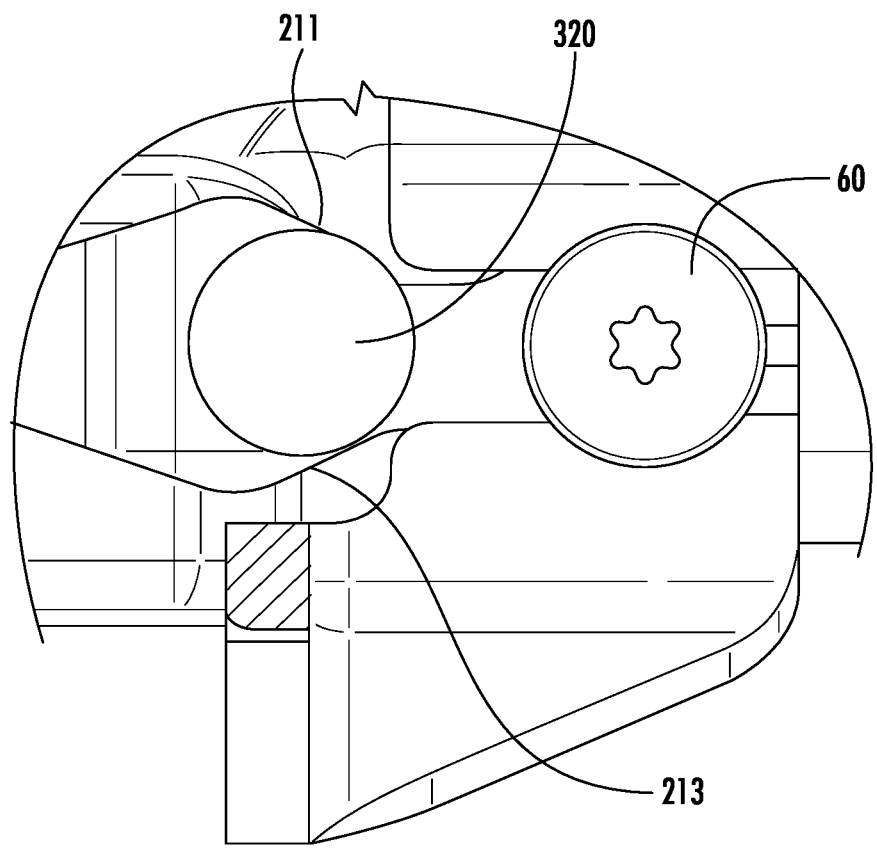

FIG. 10 shows an embodiment in which there is only a single stop 32 constituted by a peg 320 bearing against the two sides 211 and 213 of the groove 21 which comprises two V-shaped notches disposed facing one another.

Figure 11:
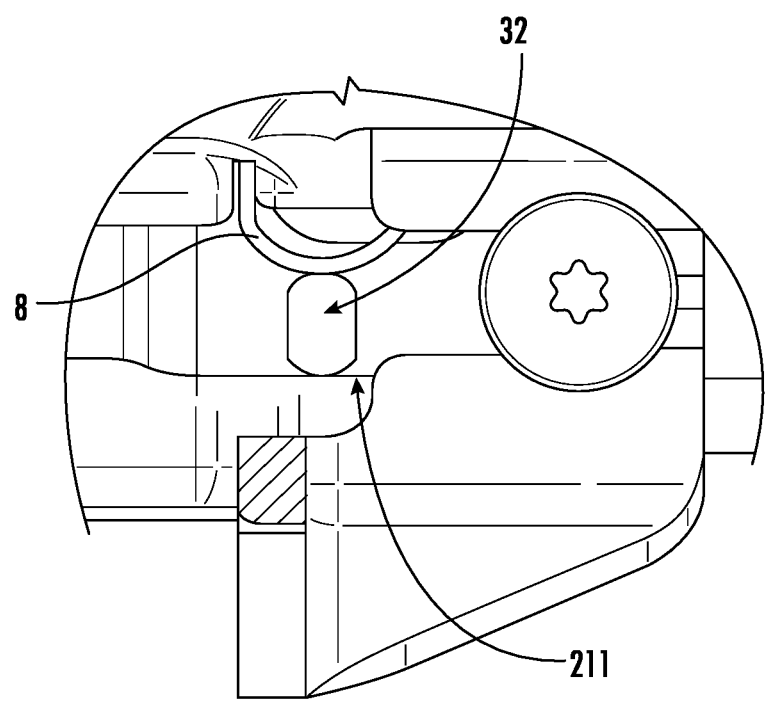

What can be seen in FIG. 11 is a stop 32 bearing against a spring element 8 such as a leaf on a first side and against the bearing surface 211 on the other side. In this case, it is not necessary to have a second stop on the other side, since the spring 8 makes it possible to laterally retain the cover 2 on the U-shaped part 3.

Figure 12:
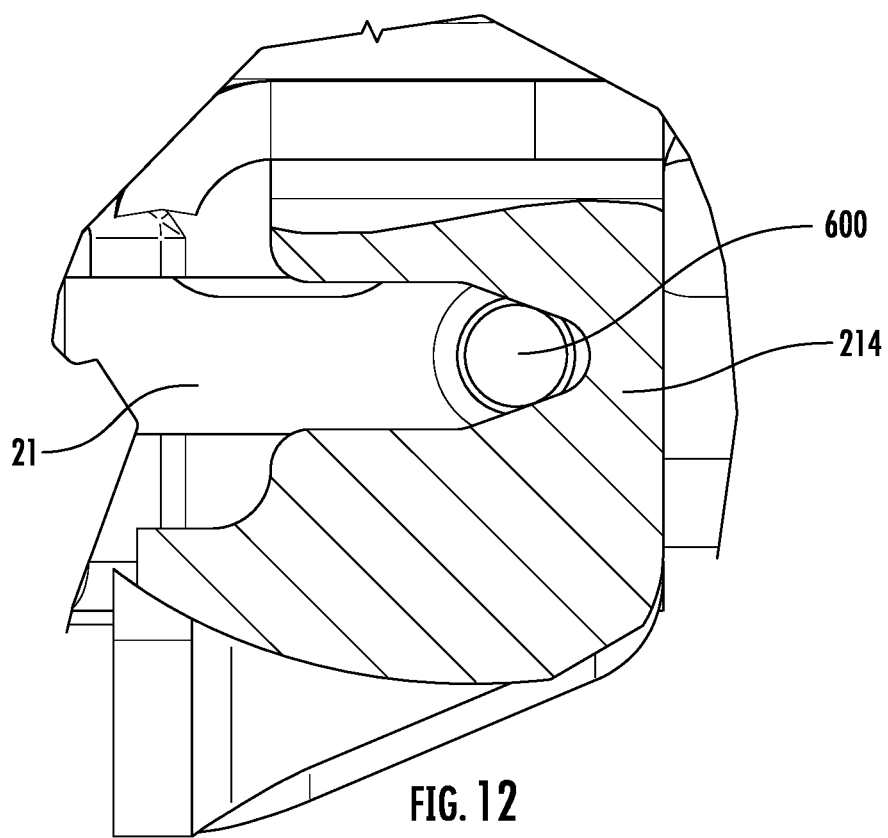

In the variant of FIG. 12, the body 600 of the screw 60 serves as a stop in this case, the groove 21 narrows at its end 214 in order that the screw body 600 bears against the two sides of the groove 21 at this end 214. The other screw 62 and the other groove 21 do not need to be modified. In this case, the assembly is performed in the following way: the screw 62 is positioned in the groove 21, then the screw 60 is inserted into the other groove 21 until the body 600 of the screw is laterally locked on the two sides at the end 214, and the screws 60 and 62 are tightened.

Figure 13:
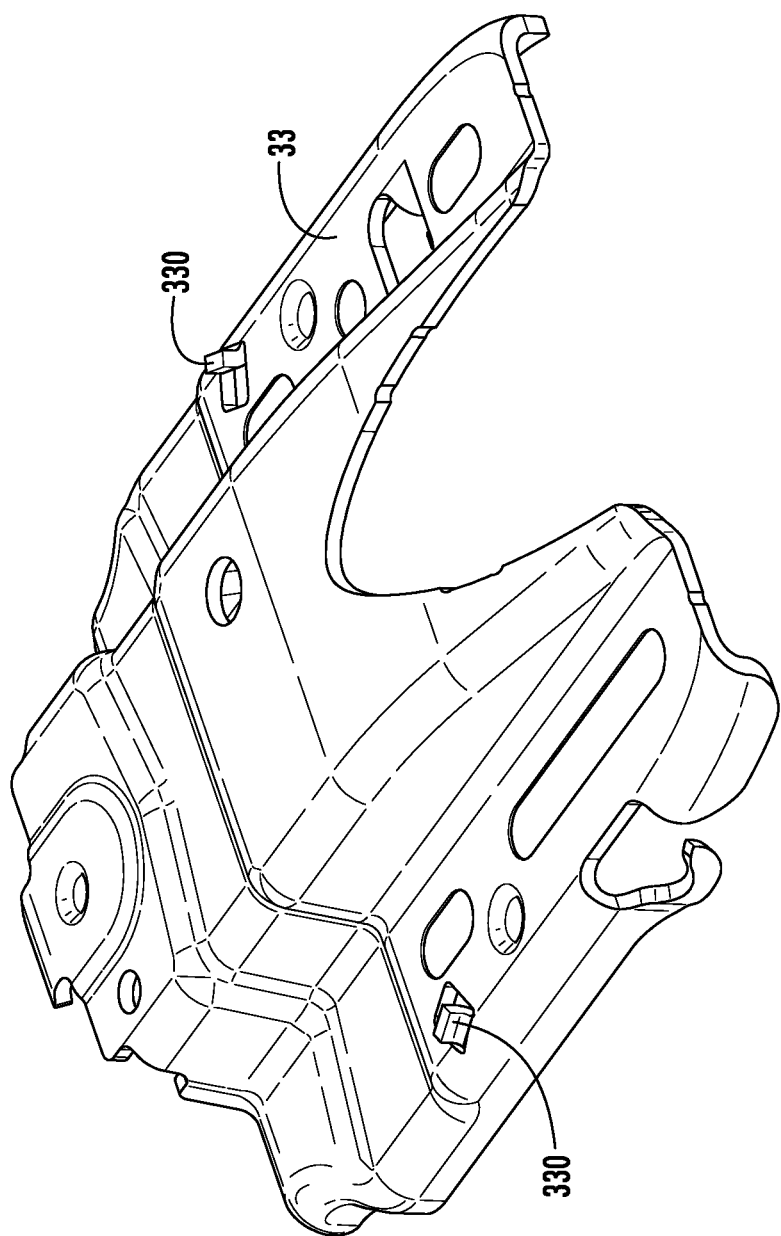

FIG. 13 illustrates another variant, in which the upper part 33 of the U-shaped part 3 comprises two semi-cutouts 330 protruding from the upper part 33 and constituting stops; during the assembly of the cover 2, the two semi-cutouts 330 deform in order to allow the passage of the cover 2, which will thus be held in place.

Figure 14:
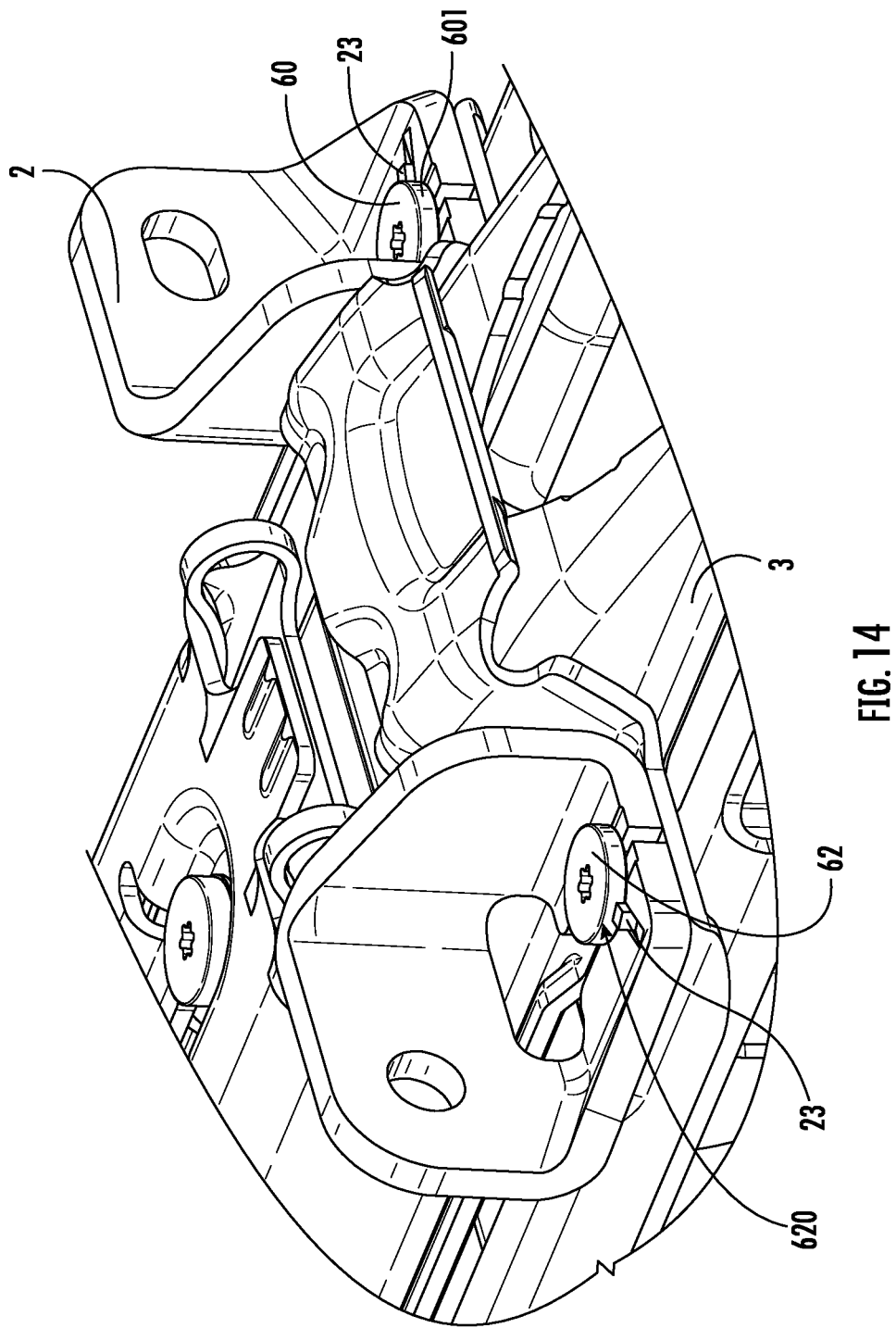

In FIG. 14, the cover 2, once it has been assembled on the U-shaped part 3 and the screws 60, 62 have been fixed, is scratched by a tool on both sides to remove the material in order to form, on each side, a scratch 23 which then constitutes a stop 32 which bears laterally against each of the screws 60, 62 the side of which constitutes a bearing surface 601, 620.

Figure 15:
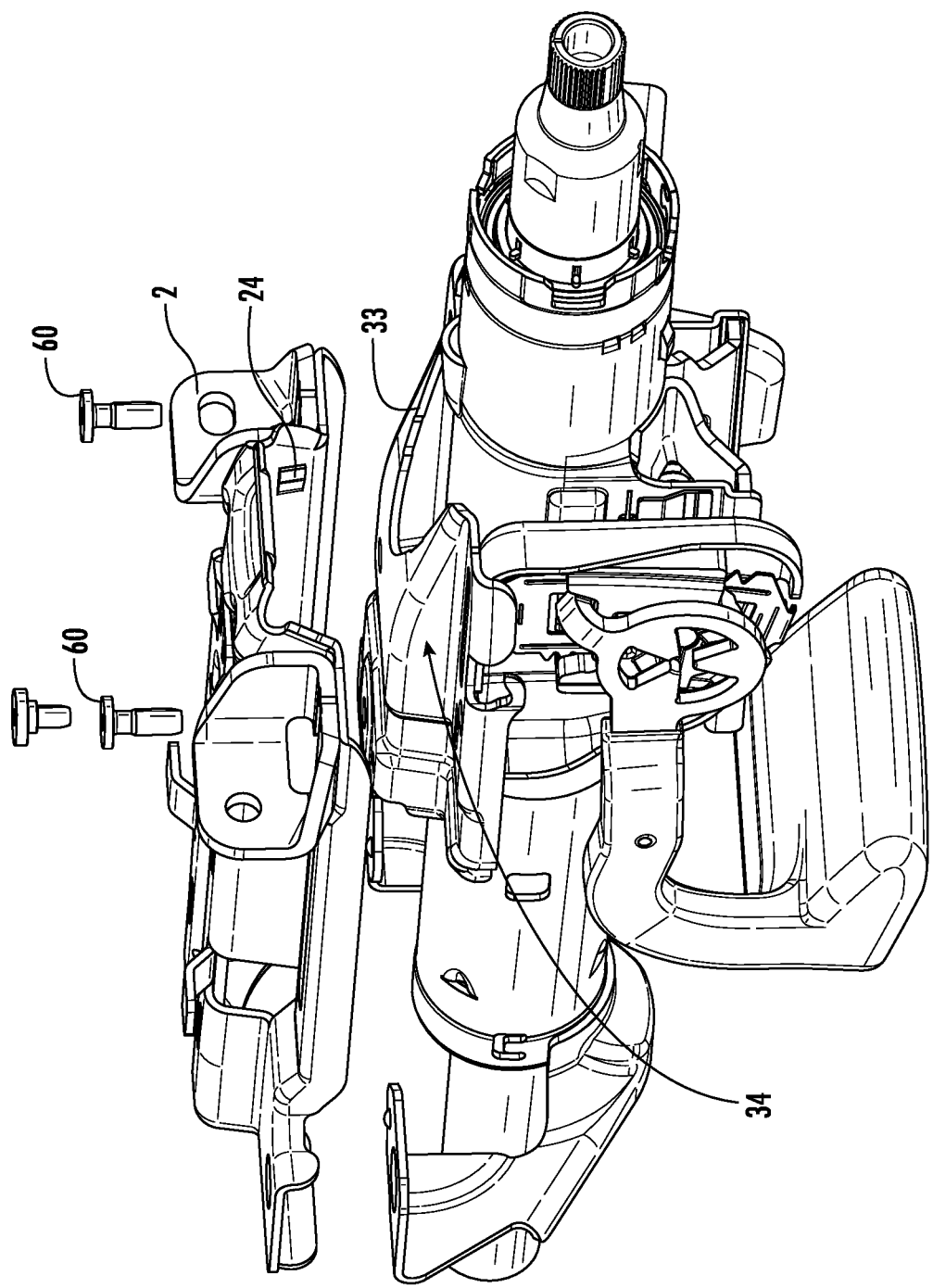

In the variant of FIG. 15, the lower part of the cover 2 has a strike 24 in relief on each side. These strikes 24 constituting stops 32 bear against an edge of the upper part 33 of the U-shaped part 3 and thus constitute a bearing surface 34.

It will be understood that various modifications and/or improvements that are obvious to a person skilled in the art can be made to the different embodiments of the disclosure that are described in the present description without departing from the scope of the disclosure defined by the appended claims.

The invention claimed is:

1. A steering column having an axis and comprising:
   a cover;
   a U-shaped tab fixed to the cover by at least one fixing screw; and
   an upper tube configured to slide with respect to a lower tube, the upper tube having at least one longitudinal groove extending along the axis the at least one fixing screw configured for displacement within the at least one longitudinal groove,
   wherein fixation of the cover to the U-shaped tab comprises at least one stop in contact with at least one lateral bearing surface disposed in the at least one longitudinal groove, the at least one stop spaced apart from the at least one screw,
   wherein the at least one longitudinal groove has a V-shaped notch in which the at least one stop is positioned,
   wherein the at least one lateral bearing surface is arranged on a first side of the V-shaped notch, and
   wherein the V-shaped notch is made in a longitudinal edge of the at least one longitudinal groove.

2. The steering column as claimed in claim 1, wherein the at least one longitudinal groove extends horizontally and has a vertical indentation on a second side of the V-shaped notch, opposite the bearing surface, such that the at least one stop leaves the at least one longitudinal groove when the U-shaped tab slides forward.

3. The steering column as claimed in claim 1, wherein the at least one lateral bearing surface forms an angle of between 10° and 45° with the axis.

4. The steering column as claimed in claim 1, wherein the at least one stop is made in one piece with the cover or the U-shaped tab.

5. The steering column as claimed in claim 4, wherein the at least one stop is made from a semi-cutout.

6. The steering column as claimed in claim 1, wherein the at least one stop is constituted by a force-fitted peg.

7. The steering column as claimed in claim 1, wherein the at least one stop is disposed on the U-shaped tab and the at least one lateral bearing surface in the cover.

8. The steering column as claimed in claim 1, wherein the at least one stop is disposed on the cover and the at least one lateral bearing surface in the U-shaped tab.

9. The steering column as claimed in claim 1, wherein:
   the at least one stop includes at least two stops,
   the at least one lateral bearing surface includes at least two lateral bearing surfaces, and
   the at least two stops and the at least two lateral bearing surfaces are disposed on either side of the cover and of the U-shaped tab.

10. The steering column as claimed in claim 1, wherein the at least one stop comprises a spring element.

11. The steering column as claimed in claim 4, wherein the at least one stop is constituted by scratches made in a surface of the cover facing the at least one fixing screw.

12. The steering column as claimed in claim 1, wherein the steering column is adjustable.

\* \* \* \* \*